US010379316B2

(12) United States Patent
Nagaoka

(10) Patent No.: US 10,379,316 B2
(45) Date of Patent: Aug. 13, 2019

(54) OPTICAL DRIVER APPARATUS, OPTICAL APPARATUS AND IMAGE CAPTURING APPARATUS

(71) Applicant: CANON KABUSHIKI KAISHA, Tokyo (JP)

(72) Inventor: Nobuyuki Nagaoka, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 217 days.

(21) Appl. No.: 15/428,517

(22) Filed: Feb. 9, 2017

(65) Prior Publication Data

US 2017/0235092 A1 Aug. 17, 2017

(30) Foreign Application Priority Data

Feb. 16, 2016 (JP) .................................. 2016-026580

(51) Int. Cl.
*G02B 7/09* (2006.01)
*G02B 7/28* (2006.01)
(Continued)

(52) U.S. Cl.
CPC ................. *G02B 7/09* (2013.01); *G02B 7/04* (2013.01); *G02B 7/282* (2013.01); *H04N 5/23212* (2013.01)

(58) Field of Classification Search
CPC . G02B 7/04; G02B 7/09; G02B 7/282; G02B 7/102; G03B 17/56; G03B 5/00;
(Continued)

(56) References Cited

U.S. PATENT DOCUMENTS 3,940,777 A * 2/1976 Komine ................. G03B 17/14
396/85
4,466,709 A * 8/1984 Osawa ..................... G02B 7/10
359/699
(Continued)

FOREIGN PATENT DOCUMENTS

JP          2773230 B2      7/1998
JP        2000221383 A      8/2000
JP        2007108373 A      4/2007

*Primary Examiner* — William R Alexander
*Assistant Examiner* — Ephrem Z Mebrahtu
(74) *Attorney, Agent, or Firm* — Rossi, Kimms & McDowell LLP

(57) ABSTRACT

The optical driver apparatus is detachably attachable to an optical apparatus. The optical apparatus includes a lens operation member operable manually, and a locking mechanism switchable between a locking state of restraining motion of the lens operation member and an unlocking state of releasing the restraint. The optical driver apparatus includes a driver operation member, an actuator configured to move the lens operation member, and a controller configured to control the actuator. The controller is configured to drive the actuator in response to an operation of the driver operation member when the locking mechanism is in the unlocking state and to control the actuator, when the locking mechanism is in the locking state, so as to provide one of a state of not driving the actuator in response to the operation of the driver operation member and a state of performing a warning operation.

6 Claims, 5 Drawing Sheets

(51) Int. Cl.
*G02B 7/04* (2006.01)
*H04N 5/232* (2006.01)

(58) Field of Classification Search
CPC .... G03B 2205/0046; G03B 2205/0053; G03B 17/14; H04N 5/23212; H04N 5/2254; H04N 5/23296
See application file for complete search history.

(56) References Cited

U.S. PATENT DOCUMENTS

| | | | |
|---|---|---|---|
| 6,130,715 A * | 10/2000 | Matsui | G02B 7/10 348/345 |
| 6,912,096 B2 | 6/2005 | Terada | |
| 9,958,754 B2 * | 5/2018 | Tanaka | G03B 3/10 |
| 2004/0114251 A1 * | 6/2004 | Kaneda | G02B 7/102 359/694 |
| 2008/0024889 A1 * | 1/2008 | Idemura | G02B 7/102 359/824 |
| 2014/0293440 A1 * | 10/2014 | Okawa | G02B 7/282 359/698 |
| 2015/0286111 A1 * | 10/2015 | Lenhof | G03B 13/34 348/357 |

\* cited by examiner

OPTICAL DRIVER APPARATUS, OPTICAL APPARATUS AND IMAGE CAPTURING APPARATUS

BACKGROUND OF THE INVENTION

Field of the Invention

The present invention relates to an optical driver apparatus attachable to optical apparatuses such as video cameras, digital cameras and interchangeable lenses.

Description of the Related Art

Optical apparatuses include ones in which a user's manual operation of an operation member such as a manual operation ring provided around a lens barrel causes a lens to move in its optical axis direction in the lens barrel to perform zooming (variation of magnification) or focusing. However, when the zooming or focusing is performed in video image capturing using such optical apparatuses (interchangeable lenses or cameras), it is often convenient for the user to electrically drive the lens using an actuator.

Japanese Patent Laid-Open No. 2007-108373 discloses an optical driver apparatus that is attached (externally connected) to a lens barrel of an interchangeable lens capable of zooming in response to a user's manual operation of a zoom operation ring and that rotationally drives the zoom operation ring using an actuator in response to a user's operation of a zoom switch.

Furthermore, Japanese Patent No. 2773230 discloses an optical driver apparatus provided with a clutch mechanism and allowing selection between manual zooming and actuator-driven zooming in response to switching of the clutch mechanism.

However, if the optical apparatus to which the optical driver apparatus is attached has a locking mechanism for locking (restraining) motion of the operation member, driving the actuator of the optical driver apparatus when the locking mechanism is in a locking state generates an excessive load in the actuator and in a transmission mechanism (gears or the like) for transmitting a driving force from the actuator to the operation member.

SUMMARY OF THE INVENTION

The present invention provides an optical driver apparatus capable of avoiding, when an optical apparatus having a locking mechanism for restraining motion of an operation member, a generation of an excessive load in an actuator and a transmission mechanism for driving the operation member. The present invention further provides an optical apparatus and an image capturing apparatus to which the optical driver apparatus is attachable.

The present invention provides as an aspect thereof an optical driver apparatus detachably attachable to an optical apparatus. The optical apparatus includes a lens operation member operable manually, and a locking mechanism switchable between a locking state of restraining motion of the lens operation member and an unlocking state of releasing the restraint. The optical driver apparatus includes a driver operation member, an actuator configured to move the lens operation member, and a controller configured to control the actuator. The controller is configured to drive the actuator in response to an operation of the driver operation member when the locking mechanism is in the unlocking state and to control the actuator, when the locking mechanism is in the locking state, so as to provide one of a state of not driving the actuator in response to the operation of the driver operation member and a state of performing a warning operation.

The present invention provides as other aspects thereof an optical apparatus and an image capturing apparatus to each of which the above optical driver apparatus is detachably attachable.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

[Embodiment 1]

Figure 1:
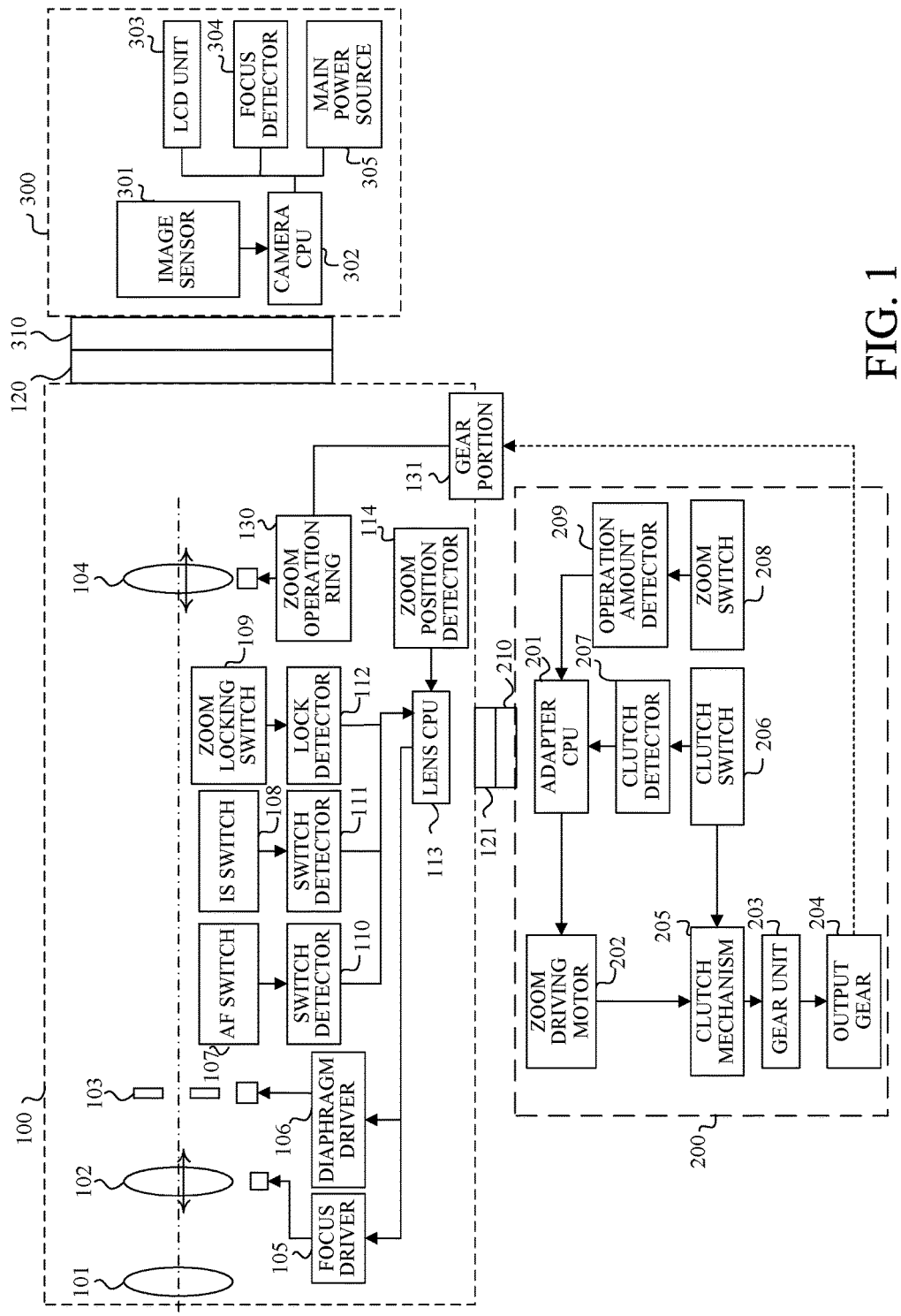
FIG. 1 is a block diagram illustrating a configuration of a camera system including a driving adapter that is Embodiment 1 of the present invention, an interchangeable lens and a camera.

FIG. 1 illustrates a driving adapter 200 as an optical driver apparatus that is a first embodiment (Embodiment 1) of the present invention. The driving adapter 200 is hereinafter simply referred to as "an adapter 200". The adapter 200 is detachably attachable to a lens barrel of an interchangeable lens 100. The interchangeable lens 100 is detachably attachable to a camera 300. The camera 300, the interchangeable lens 100 and the adapter 200 constitute a camera system. In the following description, a dashed-dotted line in FIG. 1 is referred to as "an optical axis", and a direction in which the optical axis extends is hereinafter referred to as "an optical axis direction".

The camera 300 includes an image sensor 301 that photoelectrically converts an object image formed by an image capturing optical system (described later) housed in the lens barrel of the interchangeable lens 100. The camera 300 further includes a camera CPU 302 that produces an image signal by using an output signal from the image sensor 301 and controls various operations of the camera 300.

The camera CPU 302 communicates with a lens CPU 113 included in the interchangeable lens 100 via a camera contact block 310 and a lens contact block 120.

The camera CPU 302 sends a focus drive command and a diaphragm drive command to the lens CPU 113. The camera CPU 302 further sends and receives various data to and from the lens CPU 113. The camera 300 further includes a liquid crystal display unit 303 that displays the produced image signal, a focus detector 304 that detects, using the image signal, a focus state of the image capturing optical system, and a main power source 305 that supplies electrical power to the above-described respective portions in the camera 300 and the interchangeable lens 100.

The focus detector 304 produces a contrast evaluation value signal from a high frequency component of the image signal and detects an in-focus position that is a position of a focus lens (described later) where the contrast evaluation value signal has a maximum value. The focus detector 304 thus performs contrast detection method autofocus (AF). Alternately, the focus detector 304 may calculate a defocus amount by using a phase difference between paired images mutually having a parallax and move the focus lens by a drive amount corresponding to the defocus amount. That is, the focus detector may perform phase difference detection method AF.

Around an outer circumference of the lens barrel of the interchangeable lens 100, a zoom operation ring 130 as a lens operation member that can be rotated (that is, can be moved) by a user's manual operation is provided. On an outer circumferential surface of the lens barrel, an AF switch 107 for switching AF and MF (manual focus) is provided. The AF switch 107 is switched by a user's switching operation. Furthermore, on the outer circumferential surface of the lens barrel, as user-operable switches, an IS switch 108 for activating and deactivating an image stabilization function and a zoom locking switch 109 constituting part of a locking mechanism for restraining the rotation of the zoom operation ring 130 are provided. The AF switch 107 and the IS switch 108 are respectively provided with switch detectors 110 and 111 that output detection signals indicating operated positions of these switches 107 and 108. The detection signals are input to the lens CPU 113.

A zoom locking switch 109 is user-operable to switch between a locking state of restraining, that is, locking the rotation (motion) of the zoom operation ring 130 and an unlocking state of releasing the restraint. Specifically, a use's operation of the zoom locking switch 109 to a locking position causes a convex portion of the zoom locking switch 109 to engage with a concave portion formed at one circumferential portion in the zoom operation ring 130 to mechanically restrain the rotation of the zoom operation ring 130. The zoom operation ring 130 (that is, the locking mechanism constituted by the convex portion of the zoom locking switch 109 and the concave portion of the zoom operation ring 130) thus becomes the locking state. On the other hand, a use's operation of the zoom locking switch 109 to an unlocking position causes the convex portion of the zoom locking switch 109 to separate from the concave portion of the zoom operation ring 130, which releases the restraint of the rotation of the zoom operation ring 130. The zoom operation ring 130 (that is, the locking mechanism) thus becomes the unlocking state.

The locking position and the unlocking position that are operated positions of the zoom locking switch 109 are detected by a lock detector 112. A detection result of the operated position of the zoom locking switch 109 output from the lock detector 112, that is, lock information showing whether the operated position is the locking position or the unlocking position is input to the lens CPU 113. Then, the lens CPU 113 sends the lock information to an adapter CPU 201 in the adapter 200.

The lens barrel of the interchangeable 100 houses the image capturing optical system including a fixed lens unit 101, a focus lens 102 movable in the optical axis direction to perform focusing, a diaphragm 103 controlling a light amount and a magnification-varying lens unit 104 movable in the optical axis direction to perform variation of magnification. Furthermore, in the lens barrel, a zoom position detector 114 is provided that detects a position of the magnification-varying lens unit 104 (that is, a zoom position).

The lens CPU 113 controls actuators in a focus driver 105 and a diaphragm driver 106 depending on the focus drive command and the diaphragm drive command received from the camera CPU 302. Thereby, the focus lens 102 is moved in the optical axis direction for focusing, and the diaphragm 103 changes its aperture diameter for light amount control. A user's rotation operation of the zoom operation ring 130 moves the magnification-varying lens unit 104 in the optical axis direction. Thereby, the manual focus is performed. The above-described zoom locking switch 109 is provided for restraining a movement of the magnification-varying lens unit 104 due to its own weight when the interchangeable lens 100 is lowered and due to vibration or the like added to the interchangeable lens 100.

Furthermore, the lens CPU 113 communicates with the adapter CPU 201 in the adapter 200 via a lens contact block 121 and an adapter contact block 210.

The adapter 200 has locking claws (not illustrated) engageable and disengageable with respect to the lens barrel of the interchangeable lens 100. The adapter 200 is attached to the interchangeable lens 100 by the engagement of the locking claws with the lens barrel. The adapter 200 includes a zoom driving motor 202 that is an actuator for rotationally driving the zoom operation ring 130, a gear unit 203 as a transmission mechanism and an output gear 204 that engages with a gear portion 131 formed on an outer circumferential portion of the zoom operation ring 130.

A rotational driving force from the zoom driving motor 202 is transmitted through the gear unit 203 to the output gear 204 to rotate the output gear 204. Thus, the zoom operation ring 130 is rotationally driven, and thereby power (motorized) zoom is performed.

In addition, the adapter 200 includes a clutch mechanism 205 that is provided between the zoom driving motor 202 and the gear unit 203 and that connects the zoom driving motor 202 with the gear unit 203 and releases the connection. Moreover, the adapter 200 includes a clutch switch 206 that is user-operable for switching the clutch mechanism 205 between a connecting state and a disconnecting state. An operated position of the clutch switch 206 is detected by a clutch detector 207.

Furthermore, the adapter 200 includes a zoom switch 208 as a driver operation member that is user-operable for instructing performance of the motor-driven zoom. In response to a user's operation of the zoom switch 208, its operation amount is detected by an operation amount detector 209, and a zoom operation signal corresponding to the detected operation amount is input to the adapter CPU 201 as a controller. The adapter CPU 201 provides a drive signal depending on the zoom operation signal to the zoom driving motor 202 to rotationally drive the zoom driving motor 202. Thereby, the motor-driven zoom to a target zoom position corresponding to the operation amount of the zoom switch 208 is performed.

Figure 3:
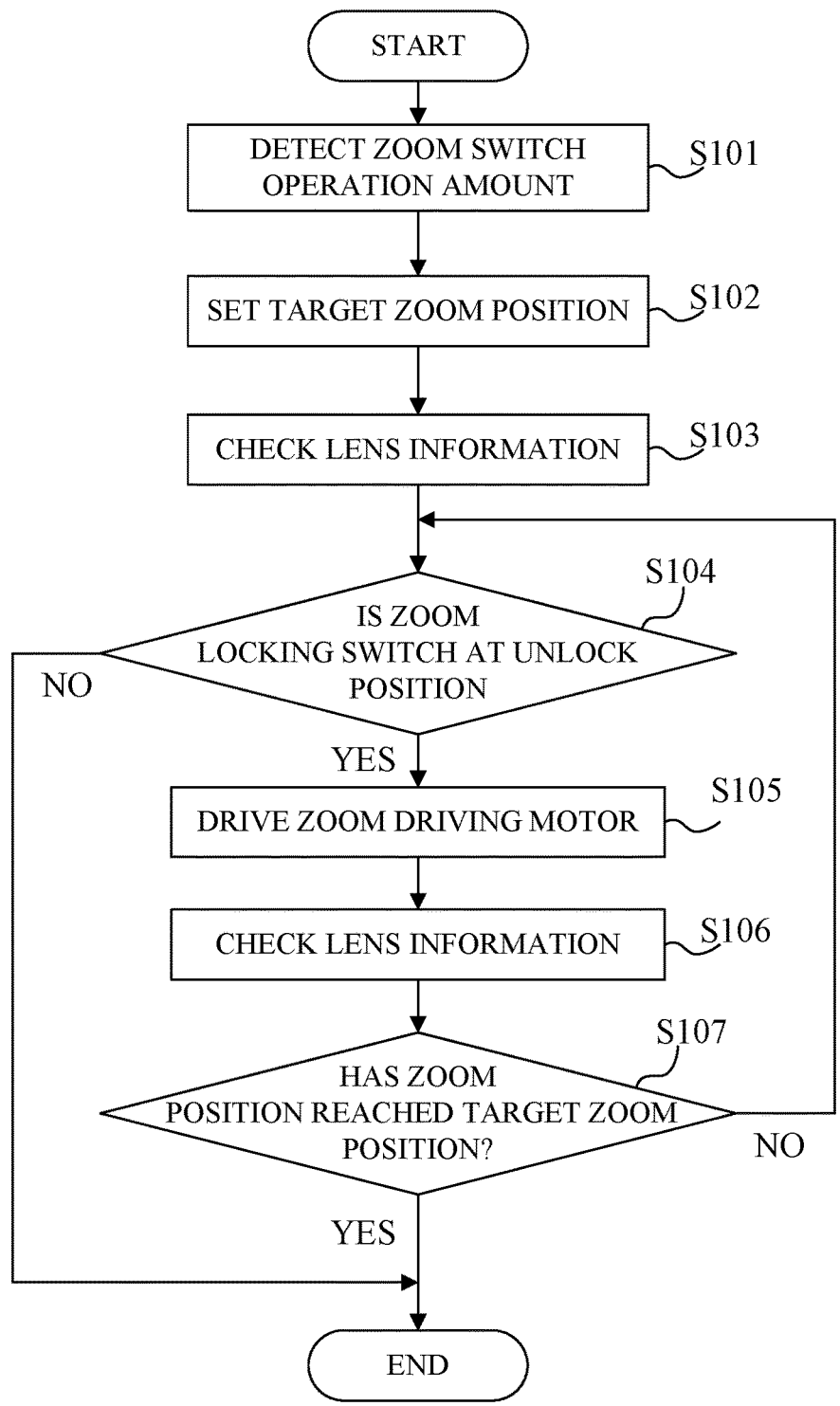
FIG. 3 is a flowchart illustrating a lens driving process in Embodiment 1.

Next, with referring to a flowchart of FIG. 3, description will be made of a lens driving process performed by the adapter CPU 201 in this embodiment. The adapter CPU 201 as a computer executes this process according to a lens driving program (optical driving program) as a computer program.

At step S101, the adapter CPU 201 detects a user's operation amount of the zoom switch 208 through the operation amount detector 209.

Next, at step S102, the adapter CPU 201 sets a target zoom position depending on the operation amount detected at step S101.

Next, at step S103, the adapter CPU 201 communicates with the lens CPU 113 to acquire lens information. The lens information includes information on the zoom position, the lock information on the operated position of the zoom locking switch 208 and other information in the interchangeable lens 100.

Next, at step S104, the adapter CPU 201 determines from the received lock information whether the zoom locking switch 109 is at the locking position or at the unlocking position (that is, whether the locking mechanism is in the locking state or in the unlocking state). This determination may be made by the lens CPU 113 acquiring the lock information, and a result of the determination may be sent from the lens CPU 113 to the adapter CPU 201.

If the zoom locking switch 109 is at the unlocking position, the adapter CPU 201 proceeds to step S105 to drive the zoom driving motor 202 so as to move the zoom position toward the target zoom position. Then, the adapter CPU 201 at step S106 checks the zoom position included in the lens information to determine at step S107 whether or not the zoom position has reached the target zoom position. If the zoom position has not yet reached the target zoom position, the adapter CPU 201 repeats the processes at steps 104 to 107. If the zoom position has reached the target zoom position, the adapter CPU 201 ends this process.

On the other hand, the adapter CPU 201 having determined that the zoom locking switch 109 is at the lock position at step S104 ends this process without driving the zoom driving motor 202. That is, in the locking state, the adapter CPU 201 becomes a non-driving state of not driving the zoom driving motor 202 in response to the user's operation of the zoom switch 208. In other words, in the locking state, the adapter CPU 201 restricts (prohibits) the drive of the zoom driving motor 202 in response to the user's operation of the zoom switch 208.

Driving the zoom driving motor 202 in the locking state where the rotation of the zoom operation ring 130 is restricted may generate an excessive load in the zoom driving motor 202, the gear unit 203 and the output gear 204. On the other hand, this embodiment does not drive the zoom driving motor 202 (that is, restricts the drive of the zoom driving motor 202) in the locking state, which enables avoiding the generation of such an excessive load.

[Embodiment 2]

Next, description will be made of an adapter 200' that is a second embodiment (Embodiment 2) of the present invention. Embodiment 1 described the case of not driving the zoom driving motor 202 in the adapter 200 when the zoom locking switch 109 is at the locking position. However, only prohibiting the drive of the zoom driving motor 202 may make it hard for the user to understand a reason why the adapter 200 does not start the motor-driven zoom in response to the operation of the zoom switch 208.

Thus, in this embodiment the adapter 200' is provided with an LED indicator 220 that lights or blinks to indicate a warning in response to the operation of the zoom switch 208 when the zoom locking switch 109 is at the locking position. It is desirable that the LED indicator 220 have an emission color dedicated for the warning indication, that is, different from a normal emission color for indicating, for example, power-on of the adaptor 200'. Alternately, a similar warning indication may be performed on the liquid crystal display unit 303 of the camera 300. In this case, a warning message may be displayed for accurately conveying the content of the warning. Instead of or together with the warning indication, a warning sound (including a warning message) may be output from a speaker provided to the adapter 200 or the camera 300.

The adapter CPU 201 becoming a warning state of performing a warning operation (that is, outputting the warning indication or the warning sound) enables a user to understand that the motor-driven zoom is not performed in response to the operation of the zoom switch 208 since the zoom locking switch 109 is at the locking position.

Figure 2:
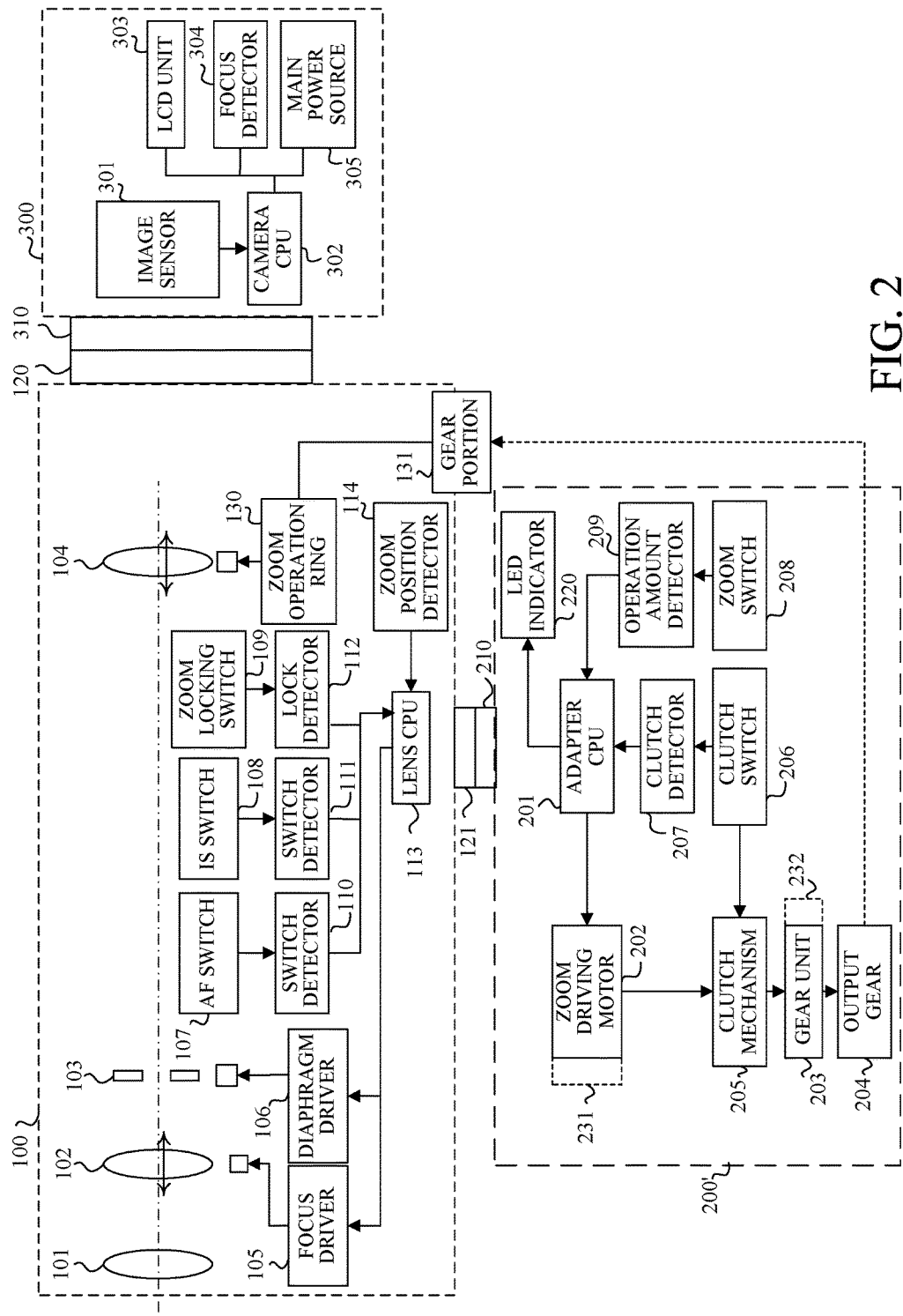
FIG. 2 is a block diagram illustrating a configuration of a camera system including a driving adapter that is Embodiments 2 and 3 of the present invention, an interchangeable lens and a camera.

FIG. 2 illustrates a configuration of a camera system of this embodiment. The configuration of the camera system of this embodiment is the same as that of the camera system of Embodiment 1 illustrated in FIG. 1 except that the LED indicator 220 is provided to the adapter 200'. In the camera system of this embodiment, constituent elements common to those of the camera system of Embodiment 1 are denoted by the same reference numerals as those in Embodiment 1, and their description is omitted.

Figure 4:
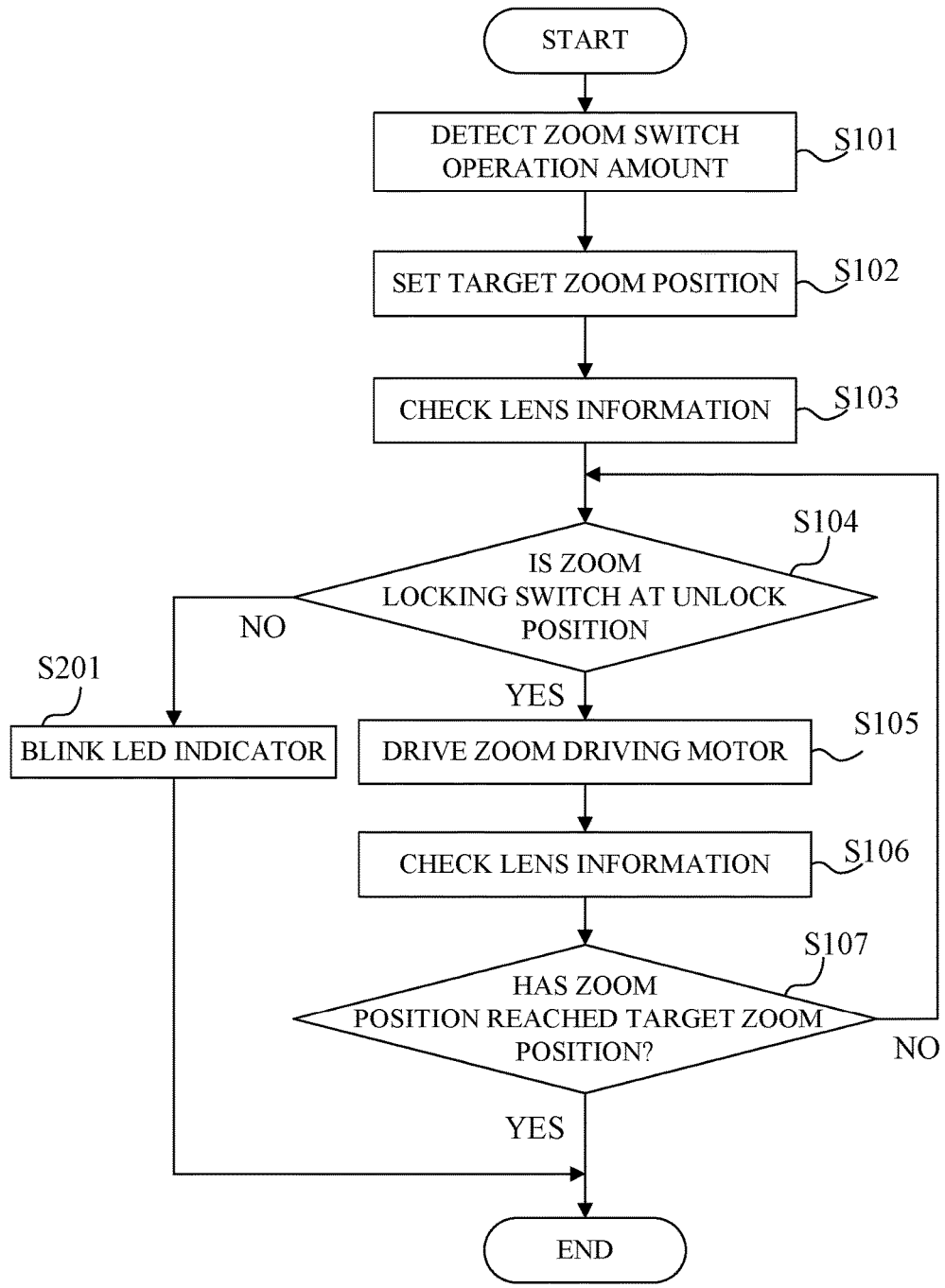
FIG. 4 is a flowchart illustrating a lens driving process in Embodiment 2.
Figure 5:
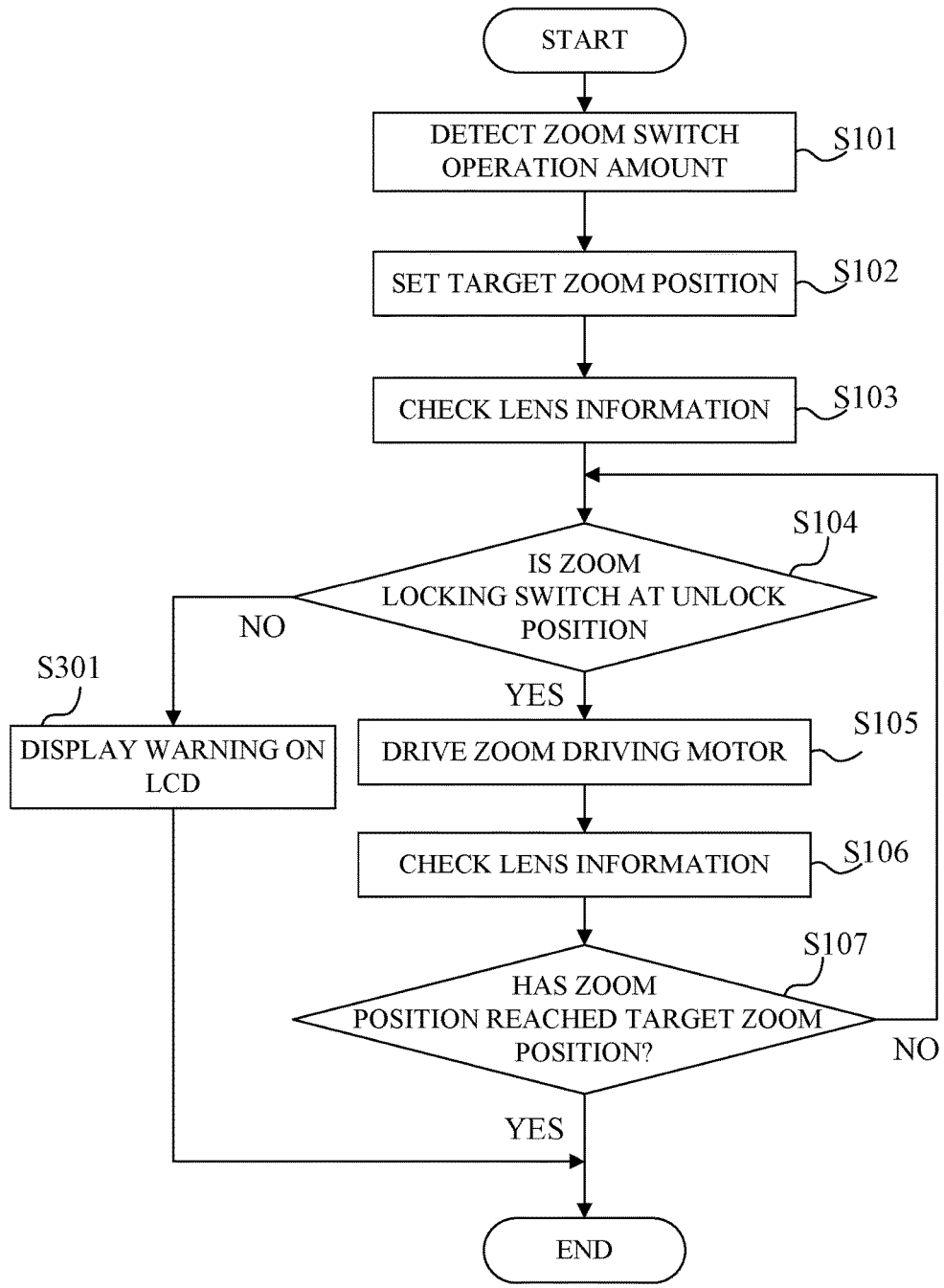
FIG. 5 is a flowchart illustrating another lens driving process in Embodiment 2.

FIGS. 4 and 5 are flowcharts illustrating lens driving processes performed by the adapter CPU 201 in this embodiment. The adapter CPU 201 as a computer executes each of these processes according to a lens driving program (optical driving program) as a computer program. Processes at steps S101 to S107 in these flowcharts are the same as those at steps S101 to S107 illustrated in the flowchart of FIG. 3 in Embodiment 1.

In FIG. 4, the adapter CPU 201 having determined at step S104 that the zoom locking switch 109 is at the locking position proceeds to step S201 to perform the warning indication by blinking (or lighting) the LED indicator 220. Then, the adapter CPU 201 ends this process without driving the zoom driving motor 202 as in Embodiment 1.

On the other hand, in FIG. 5, the adapter CPU 201 having determined at step S104 that the zoom locking switch 109 is at the locking position proceeds to step S301. At step S301, the adapter CPU 201 causes, in response to the operation of the zoom switch 208 when the zoom locking switch 109 is at the locking position (steps S101 and S104), the lens CPU 113 to send warning information to the camera CPU 302.

The camera CPU 302 causes, in response to receipt of the warning information, the liquid crystal display unit 303 of the camera 300 to perform the warning indication that corresponds to the blinking (or lighting) of the LED indicator 220 or that displays the warning message. Then, the adapter CPU 201 ends this process without driving the zoom driving motor 202 as in Embodiment 1.

At step S201 or S301, the adapter CPU 201 may output the warning sound instead of or together with the warning indication, as described above.

Embodiments 1 and 2 described the case where, when the zoom locking switch 109 is at the locking position, the zoom driving motor 202 is not driven in response to the operation of the zoom switch 208. However, the warning operation may be performed while driving the zoom driving motor 202 such that the motor 202 generates a smaller driving force than that generated in a normal state (or while applying a small electric current to the motor 202 to cause the motor 202 to generate little driving force).

[Embodiment 3]

Embodiments 1 and 2 described the case where whether the zoom locking switch 109 is at the locking position or the unlocking position is detected by the lock detector 112 provided in the interchangeable lens 100 and where the adapter CPU 201 communicates with the lens CPU 113 to acquire the lock information indicating the detection result. However, lock detectors (illustrated by dashed lines in FIGS.

2) 231 and 232 provided to the adapter 200 (200') may detect whether the zoom locking switch 109 is at the locking position or the unlocking position.

For example, the operation of the zoom switch 208 in the locking state increases a load of the zoom driving motor 202 to increase a current value applied to the motor 202. Thus, the locking state can be detected by detecting that the current value detected by the lock detector 231 as a current detector provided in the zoom driving motor 202 becomes greater than a predetermined value.

Alternately, a clutch that is disconnected by its load increased due to a start of the drive of the zoom driving motor 202 in the locking state is provided in the gear unit 203, and the locking state can be detected by detecting that the clutch is disconnected through the lock detector 232.

In these examples, although the drive of the zoom driving motor 202 is started in response to the operation of the zoom switch 208 in the locking state, immediately thereafter the locking state is detected and thereby the zoom driving motor 202 becomes a non-driven state where the motor 202 is not driven. As a result, as in Embodiments 1 and 2, it is possible to avoid the generation of the excessive lord in the zoom driving motor 202 and the gear unit 203.

Furthermore, although each of the above embodiments described the combination of the interchangeable lens 100 provided with the locking mechanism for locking the zoom operation ring 130 and the adapter 200, the lens driving process described in each embodiment may be performed in a combination of an interchangeable lens provided with a locking mechanism for locking its operation member other than the zoom operation ring, such as a focus operation ring, and the adapter 200.

Moreover, although each of the above embodiments described the case where the adapter 200 is attached to the interchangeable lens 100, the lens driving process described in each embodiment may be performed in a case where an adapter is attached to a lens barrel of a lens-integrated camera (optical apparatus).

The adapter of each embodiment does not drive the actuator or performs the warning operation when the driver operation member is operated in the locking state where the locking mechanism restricts the motion of the lens operation member, which can avoid the generation of the excessive load in the actuator and the transmitting mechanism for transmitting the driving force from the actuator to the operation member.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-026580, filed on Feb. 16, 2016, which is hereby incorporated by reference herein in its entirety.

What is claimed is:

1. An optical driving apparatus detachably attachable to an optical apparatus,
the optical apparatus including:
a lens operation member operable manually; and
a locking mechanism switchable between a locking state of restraining motion of the lens operation member and an unlocking state of releasing the restraint,
the optical driving apparatus comprising:
a driving operation member;
an actuator configured to move the lens operation member; and
a controller configured to control the actuator,
wherein the locking mechanism includes a first portion and a second portion,
wherein the first portion engages with the second portion in the locking state and the first portion separates from the second portion in the unlocking state, and
wherein the controller is configured to:
drive the actuator in response to an operation of the driving operation member when the locking mechanism is in the unlocking state; and
control the actuator, when the locking mechanism is in the locking state, so as to provide one of a state of not driving the actuator in response to the operation of the driving operation member and a state of performing a warning operation.

2. An optical driving apparatus according to claim 1, wherein:
the optical apparatus includes a detector configured to detect the locking state and the unlocking state of the locking mechanism; and
the controller is configured to acquire a detection result of the detector through communication with the optical apparatus.

3. An optical driving apparatus according to claim 1, further comprising a detector configured to detect the locking state and the unlocking state of the locking mechanism.

4. An optical apparatus comprising:
a lens operation member operable manually; and
a locking mechanism switchable between a locking state of restraining motion of the lens operation member and an unlocking state of releasing the restraint,
wherein:
the optical apparatus is configured such that an optical driving apparatus is detachably attachable thereto; and the optical driving apparatus comprises:
a driving operation member;
an actuator configured to move the lens operation member; and
a controller configured to control the actuator,
wherein the locking mechanism includes a first portion and a second portion,
wherein the first portion engages with the second portion in the locking state and the first portion separates from the second portion in the unlocking state, and
wherein the controller is configured to:
drive the actuator in response to an operation of the driving operation member when the locking mechanism is in the unlocking state; and
control the actuator, when the locking mechanism is in the locking state, so as to provide one of a state of not driving the actuator in response to the operation of the driving operation member and a state of performing a warning operation.

5. An optical apparatus according to claim 4, wherein:
the optical apparatus is a lens apparatus that is detachably attachable to an image capturing apparatus including an image sensor and that includes an image capturing optical system; and
the lens apparatus is configured to send, when the locking mechanism is in the locking state, warning information to the image capturing apparatus in response to the operation of the driving operation member.

6. An image capturing apparatus that includes an image sensor and to which an optical apparatus as a lens apparatus is detachably attachable,
wherein the optical apparatus comprises:
an image capturing optical system;
a lens operation member operable manually; and
a locking mechanism switchable between a locking state of restraining motion of the lens operation member and an unlocking state of releasing the restraint,
wherein the optical apparatus is configured such that an optical driving apparatus is detachably attachable thereto;
wherein the optical driving apparatus comprises:
a driving operation member;
an actuator configured to move the lens operation member; and
a controller configured to control the actuator,
wherein the locking mechanism includes a first portion and a second portion,
wherein the first portion engages with the second portion in the locking state and the first portion separates from the second portion in the unlocking state,
wherein the controller is configured to:
drive the actuator in response to an operation of the driving operation member when the locking mechanism is in the unlocking state, and
control the actuator, when the locking mechanism is in the locking state, so as to provide one of a state of not driving the actuator in response to the operation of the driving operation member and a state of performing a warning operation; and
wherein:
the optical apparatus is configured to send, when the locking mechanism is in the locking state, warning information to the image capturing apparatus in response to the operation of the driving operation member; and
the image capturing apparatus is configured to perform a warning operation in response to receipt of the warning information.

* * * * *